US009856995B2

(12) United States Patent
Roodenburg et al.

(10) Patent No.: US 9,856,995 B2
(45) Date of Patent: Jan. 2, 2018

(54) TUBULAR INSTALLATION SYSTEM FOR J-LAYING TUBULARS, MARINE PIPELAY SYSTEM AND METHOD FOR HANDLING A TUBULAR OR ACCESSORY

(71) Applicant: ITREC B.V., Schiedam (NL)

(72) Inventors: Joop Roodenburg, Delft (NL); Ronny Lambertus Waltherus Nouwens, Schiedam (NL); Terence Willem August Vehmeijer, Den Haag (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 15/303,986

(22) PCT Filed: Apr. 14, 2015

(86) PCT No.: PCT/NL2015/050242
§ 371 (c)(1),
(2) Date: Nov. 23, 2016

(87) PCT Pub. No.: WO2015/160245
PCT Pub. Date: Oct. 22, 2015

(65) Prior Publication Data
US 2017/0138508 A1    May 18, 2017

(30) Foreign Application Priority Data
Apr. 14, 2014 (NL) .................................... 2012616

(51) Int. Cl.
*F16L 1/19* (2006.01)
*B63B 35/03* (2006.01)
(Continued)

(52) U.S. Cl.
CPC .............. *F16L 1/207* (2013.01); *B63B 35/03* (2013.01); *F16L 1/19* (2013.01); *F16L 1/203* (2013.01); *E21B 19/22* (2013.01)

(58) Field of Classification Search
CPC ... F16L 1/207; F16L 1/19; F16L 1/203; B63B 35/03; E21B 19/22
See application file for complete search history.

(56) References Cited

U.S. PATENT DOCUMENTS 4,068,490 A * 1/1978 Jegousse .................. F16L 1/19
405/166
5,421,675 A * 6/1995 Brown ..................... F16L 1/15
405/158
(Continued)

FOREIGN PATENT DOCUMENTS

WO   WO 2012/091560 A2   7/2012
WO   WO 2013/089561 A1   6/2013

*Primary Examiner* — Benjamin Fiorello
(74) *Attorney, Agent, or Firm* — Birch, Stewart, Kolasch & Birch, LLP (57) ABSTRACT

A tubular installation system includes a J-lay tower structure for lowering and raising a tubular or an accessory along a firing line; a tubulars supply system; an accessory supply system; and a loader system configured for transporting a tubular and an accessory between the horizontal tubular supply position and the firing line, wherein the loader system comprises: a loader device with a base and a boom which is pivotable with respect to the base between a lowered position for gripping a tubular and an accessory in the horizontal accessory supply position, and a raised position for delivering then to the firing line; a line-up tool, wherein the line-up tool is configured to exchange a tubular and an accessory with the loader device and transport a tubular between the loader device and the firing line.

20 Claims, 9 Drawing Sheets

(51) Int. Cl.
*F16L 1/20* (2006.01)
*E21B 19/22* (2006.01)

(56) References Cited

U.S. PATENT DOCUMENTS

| | | | |
|---|---|---|---|
| 7,189,028 B1* | 3/2007 | Signaroldi | B63B 35/03 |
| | | | 405/166 |
| 7,744,311 B2* | 6/2010 | Vergouw | |
| 7,955,028 B2* | 6/2011 | Roodenburg | F16L 1/14 |
| | | | 405/158 |
| 8,915,674 B2* | 12/2014 | Feijen | F16L 1/16 |
| | | | 405/166 |
| 2002/0021943 A1* | 2/2002 | Frijns | B23K 37/0533 |
| | | | 405/170 |
| 2003/0044235 A1* | 3/2003 | Stockstill | B63B 35/03 |
| | | | 405/154.1 |
| 2003/0147699 A1* | 8/2003 | Long | F16L 1/203 |
| | | | 405/158 |
| 2005/0019100 A1* | 1/2005 | Simpson | F16L 1/19 |
| | | | 405/166 |
| 2009/0324339 A1* | 12/2009 | Roodenburg | F16L 1/19 |
| | | | 405/166 |
| 2011/0236137 A1* | 9/2011 | Legaignoux | F16L 1/19 |
| | | | 405/158 |

* cited by examiner

TUBULAR INSTALLATION SYSTEM FOR J-LAYING TUBULARS, MARINE PIPELAY SYSTEM AND METHOD FOR HANDLING A TUBULAR OR ACCESSORY

The invention relates to a tubular installation system for J-laying tubulars, a marine pipelay system and a method for handling a tubular or accessory.

A tubular installation system for J-laying tubulars is known from international patent publication WO2012/091560 from the applicant. The in WO2012/091560 disclosed tubular installation system comprises a J-lay tower structure for lowering and/or raising a tubular or an accessory along a firing line extending along the tower structure, a support for supporting the J-lay tower structure, a tubulars supply system for supplying tubulars to an essentially horizontal tubular supply position in the vicinity of the tower structure, and an accessory supply system for supplying an accessory to an essentially horizontal accessory supply position in the vicinity of the tower structure.

To transport a tubular or an accessory from respectively the essentially horizontal tubular supply position or the essentially horizontal tubular accessory supply position to the firing line, use is made of a loader device having a boom that is pivotable relative to a base in a boom pivot direction about a horizontal boom pivot axis between a lowered position for gripping a tubular in the essentially horizontal tubular supply position or for gripping an accessory in the essentially horizontal accessory supply position, and a raised position for delivering a tubular to the firing line and vice versa.

A disadvantage of the already known tubular installation system is that it is rather complex in order to be able to handle and manipulate both tubulars and accessories in order to transport said tubulars and accessories to and from the firing line, because the tubulars and accessories differ dramatically in size.

It is therefore an object of the invention to provide a tubular installation system that is less complex and still able to transport both tubulars and accessories from and to the firing line of the J-lay tower structure.

This object is achieved by a tubular installation system for J-laying tubulars, wherein the system comprises:
a) a J-lay tower structure for lowering and raising a tubular or an accessory along a firing line extending along the tower structure;
b) a tubulars supply system for supplying tubulars to an essentially horizontal tubular supply position;
c) an accessory supply system for supplying an accessory to an essentially horizontal accessory supply position;
d) a loader system configured for transporting a tubular between the tubular supply position and the firing line, and configured for transporting an accessory between the accessory supply position and the firing line, wherein the loader comprises a loader device and a line-up tool,
wherein the loader device comprises a base and a boom which is pivotable with respect to the base between a lowered position for gripping a tubular in the tubular supply position and for gripping an accessory in the accessory supply position, and a raised position for exchanging a tubular or accessory with the line-up tool,
wherein the line-up tool is configured to exchange a tubular with the loader device and to transport a tubular between the loader device and the firing line, and wherein the line-up tool is further configured to exchange an accessory with the loader device and to transport an accessory between the loader device and the firing line An advantage of this tubular installation system is that the line-up tool is configured to exchange both a tubular and an accessory, which makes the use of separate line-up tools superfluous and thus the system less complex.

In an embodiment, the tubular installation system further comprises a support for supporting the J-lay tower, and wherein preferably one or more of the following are also provided on the support: the tubulars supply system, the accessory supply system and the loader device of the loader system.

In an embodiment, the loader system further comprises supply rails provided on the J-lay tower structure and extending in an essentially horizontal direction between the J-lay tower structure and the loader device at least during transport of a tubular or accessory between the loader device and the firing line when the loader device is in the raised position, and wherein the line-up tool is configured to travel along the supply rails.

This has the advantage that size and reach of the line-up tool can be independent of the distance between the firing line and the loader device. This distance can mainly be overcome by moving over the supply rails and getting into the vicinity of the firing line and the loader device.

In an embodiment, the boom of the loader device of the loader system is pivotable with respect to the base in a boom pivot direction about a horizontal boom pivot axis.

In a specific embodiment, the tubular installation system for J-lay tubulars may be described to comprise:
a) a J-lay tower structure for lowering and/or raising a tubular or an accessory along a firing line extending along the tower structure;
b) a support for supporting the J-lay tower structure;
c) a tubulars supply system, preferably provided on the support, for supplying tubulars to an essentially horizontal tubular supply position in the vicinity of the tower structure;
d) an accessory supply system, preferably provided on the support, for supplying an accessory to an essentially horizontal accessory supply position in the vicinity of the tower structure;
e) a loader system configured for transporting a tubular between the essentially horizontal tubular supply position and the firing line, and configured for transporting an accessory between the essentially horizontal accessory supply position and the firing line, wherein the loader system comprises:
i. a loader device, preferably provided on the support, with a base and a boom which is pivotable with respect to the base in a boom pivot direction about a horizontal boom pivot axis between a lowered position for gripping a tubular in the essentially horizontal tubular supply position or for gripping an accessory in the essentially horizontal accessory supply position, and a raised position for delivering a tubular or an accessory to the firing line and vice versa;
ii. supply rails provided on the J-lay tower structure and extending in an essentially horizontal direction between the J-lay tower structure and the loader device at least during transport of a tubular or accessory between the loader device and the firing line when the loader device is in the raised position;
iii. a line-up tool to travel along the supply rails, wherein the line-up tool is configured to exchange a tubular with the loader device and transport a tubular between the loader device and the firing line, and wherein the line-up tool is configured to exchange an accessory with the loader device and transport an accessory between the loader device and the firing line.

In order to handle tubulars the line-up tool is preferably provided with a tubular gripper adapted for gripping a tubular.

In an embodiment, the line-up tool comprises a base member, a moveable member and an actuation system for positioning the moveable member relative to the base member, wherein when the line-up tool comprises a tubular gripper adapted for gripping a tubular this tubular gripper is provided on the moveable member. This allows to accurately position a tubular in the firing line using the actuation system.

In an embodiment, the accessory supply system is configured to supply an accessory on a supporting element to the essentially horizontal accessory supply position, wherein the supporting element comprises attachment members, wherein the boom of the loader device comprises boom attachment members to engage with at least one attachment member of the supporting element for temporarily attaching the supporting element to the boom, and wherein the line-up tool comprises tool attachment members to engage with at least one attachment member of the supporting element to temporarily attach the supporting element to the line-up tool. In a corresponding method the attachment members allow to temporarily mount the supporting element to the boom of the loader device so that the supporting element is fixed during movement between the lowered position and the raised position. Subsequently, the supporting element can be mounted to the line-up tool and the supporting element can be released by the loader device to transfer the supporting element from the loader device to the line-up tool. These steps in reverse order are carried out in order to transfer the supporting element from the line-up tool to the loader device.

In case the line-up tool comprises a base member and a moveable member as described above, the tool attachment members are preferably provided on the moveable member of the line-up tool allowing to accurately position an accessory in the firing line using the actuation system of the line-up tool.

In an embodiment, at least a portion of the supply rails are moveable between a retracted position in which an accessory can be moved between the lowered and raised position of the boom of the loader device without interfering with the supply rails, and an operational position in which the line-up tool is able to travel along said portion of the supply rails to exchange a tubular or accessory with the loader device.

The portion of the supply rails is preferably pivotable about a pivot axis that extends parallel to a longitudinal axis of the J-lay tower structure. Alternatively or additionally, said portion of the supply rails is translatable to and from the J-lay tower structure to respectively decrease or increase the distance to the loader device.

In an embodiment, the J-lay tower structure is pivotable about a substantially horizontal tower pivot axis, wherein the boom pivot axis and the tower pivot axis coincide. This makes positioning the boom relative to the J-lay tower structure substantially independent from the angular orientation of the J-lay tower structure.

In an embodiment, the tubular gripper is moveable relative to the moveable member between a retracted position in which the tool attachment members are able to engage with at least one attachment member of the supporting element, and an operational position in which the tubular gripper is able to grip a tubular.

In order to retract the tubular gripper on the moveable member, the moveable member may be provided with a hole or cavity for receiving the tubular gripper.

In an embodiment, the boom of the loader device comprises a first part, a second part and actuators to position the second part relative to the first part, wherein the boom attachment members are provided on the second part of the boom. This allows to position the accessory relative to the line-up tool.

In an embodiment, the loader system comprises a tubular gripper adapted for gripping a tubular, which tubular gripper is provided on the boom of the loader device. In a corresponding method, a tubular may be exchanged between the tubular gripper on the boom of the loader device and the tubular gripper on the line-up tool.

In an embodiment, the tubular gripper is provided on the first part of the boom of the loader device.

In an embodiment, the tubular gripper on the loader device is able to move a tubular relative to the boom between a first position in which it is able to receive a tubular from the tubulars supply system and a second position in which it is able to exchange the tubular between the loader device and the line-up tool.

In an embodiment, the accessory supply system comprises rails on the support to supply an accessory.

In an embodiment, the supporting element is configured to travel along the rails of the accessory supply system between the essentially horizontal accessory supply position and a storage position.

The invention also relates to a marine pipelay system comprising a vessel and a tubular installation system according to the invention.

In an embodiment, the tubular installation system further comprises a support for supporting at least the J-lay tower, and wherein the support of the tubular installation system is an integral part of the vessel.

In an embodiment, the loader device is arranged adjacent the tower structure such that a significant horizontal translation is required for the line-up tool to transport the tubulars or accessory between the loader device and the firing line. This horizontal translation may be such that the line-up tool is not supported by the loader device.

The invention further relates to a method for lowering a tubular or accessory using a tubular installation system according to the invention, comprising the following steps:
 a) providing the boom of the loader device in the lowered position;
 b) supplying a tubular or accessory to respectively the essentially horizontal tubular supply position or the essentially horizontal accessory supply position;
 c) gripping the tubular or accessory;
 d) moving the boom to the raised position;
 e) exchanging the tubular or accessory with the line-up tool;
 f) transporting the tubular or accessory to the firing line.

The invention also relates to a method for raising a tubular or accessory in which the reverse or opposite of the above steps are performed.

Any of the above lowering and raising may be described in general by handling a tubular or accessory.

Figure 1:
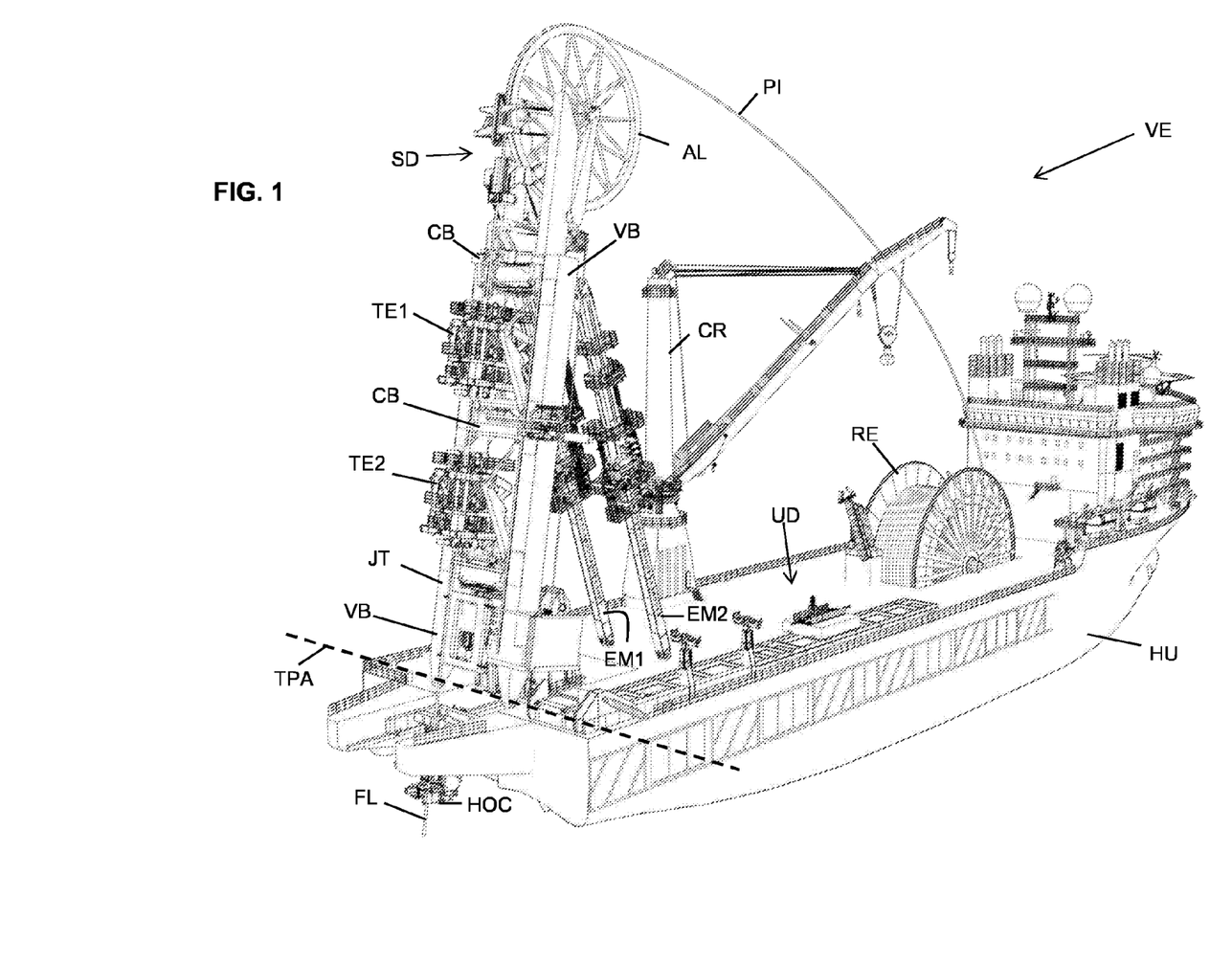
FIG. 1 depicts a marine pipelay system according to an embodiment of the invention.

The invention will now be described in a non-limiting way by reference to the accompanying drawings in which like parts are indicated by like reference symbols, and in which:

FIG. 1 depicts a marine pipelay system according to an embodiment of the invention, comprising a vessel VE with a hull HU, an upper deck UD and a tubular installation system for J-laying tubulars.

The vessel may be of a monohull design, but other designs (e.g. as a semi-submersible vessel, as a converted drilling rig, etc.) are also possible.

The tubular installation system comprises a J-lay tower structure JT for lowering and raising tubulars and accessories in a firing line FL extending along the J-lay tower structure JT. The firing line FL is essentially vertical and parallel to the J-lay tower structure JT. Preferably, the firing line is provided adjacent the J-lay tower structure. The J-lay tower structure may alternatively be referred to as tower structure or tower in this description.

The tower JT is supported by the upper deck UD which thus acts as a support for supporting the tower JT. Where the upper deck UD supports components of the tubular installation system it may be considered to be part of the tubular installation system. In other applications the support may not be formed by an upper deck, but is provided by other structural elements.

In the situation as shown in FIG. 1, the vessel VE is J-laying a rigid pipe PI, also referred to as pipeline PI, that is unwound from a permanent reel RE on the vessel VE. To this end, the pipe PI is guided from the reel RE over an aligner wheel AW at an upper end of the tower JT, through a straightener device SD, two tensioners TE1, TE2 and a hang-off clamp HOC into a body of water.

The straightener device SD is configured to plastically deform the rigid pipe after passing the aligner wheel in order to remove any significant curvature of the rigid pipe resulting from the fact that the pipeline is stored on a reel.

The tensioners TE1, TE2 are configured to hold the launched pipeline while allowing to lower or raise the pipeline, where the hang-off clamp HOC is a stationary or static pipeline support device arranged in the lower portion of the firing line, is adapted to support—on its own—the entire weight of the launched pipeline, but is not able to move the pipeline in a direction of a longitudinal axis of the pipeline.

However, it could be that the hang-off clamp does allow for displacement essentially in a plane at right angles to the supported pipeline, possibly while supporting the load of the pipeline. In this respect 'stationary' essentially means 'stationary in the direction of the longitudinal axis of the pipeline'.

The hang-off clamp HOC is in this embodiment not supported by the tower, but on the hull HU of the vessel. It is noted that the hang-off clamp could be supported by the tower if desired.

The tower JT is in this embodiment pivotable about a substantially horizontal tower pivot axis TPA, wherein the angular orientation of the tower JT relative to the upper deck UD is set by two telescopic members EM1, EM2 that can adjust their total length. In this embodiment, the inclination of the tower JT can be varied in the range from 0 degrees to 40 degrees from vertical. When desired a smaller or broader range of tower inclination, or even a non-inclinable tower, can be envisaged.

In this example, the tower JT comprises two spaced apart main vertical beams VB interconnected by a number of horizontal crossbeams of which some are indicated by reference symbol CB.

In the shown embodiment, the tower is provided on a centerline of the vessel at the stern of the vessel as a result of which the pipe PI is launched over de stern into the body of water.

The tower may also be provided above a moonpool, such that the firing line FL extends through the moonpool, which moonpool may for instance be located on the centerline of the vessel about centrally in relation to the length of the vessel. Alternatively, the tower JT may be provided at the bow or side of a vessel, as a result of which the pipeline is launched over the bow or side into the body of water.

In a not-shown, non-preferred embodiment, the tower could have the form of a derrick (e.g. a latticed framework) extending over a moonpool, wherein the firing line or pipeline launch trajectory passes within the structure of the derrick.

Also provided on the upper deck UD is a crane CR for the handling and manipulation of equipment.

An advantage of the tubular installation system of FIG. 1 is that it allows for different types of J-laying such as J-laying a pipe PI from a reel RE as shown in FIG. 1, but it is also possible to form a pipe from multiple tubulars that are welded together. In that case the tensioners TE1, TE2 are not necessary per se and can be moved to a retracted position in the tower structure JT, e.g. by moving to a space in between the cross beams CB, thereby making way for hoisting equipment that is then used to lower and raise the already laid pipeline.

During pipelaying it is regularly required to introduce an accessory in the pipeline to be lowered along with the pipeline into the body of water. A method to introduce such an accessory into the pipeline for lowering will be described below by reference to FIGS. 2-9 in which a more detailed aft portion of the vessel VE is shown.

FIGS. 2-9 show the already mentioned hull HU, tower JT with vertical beams VB and cross beams CB, upper deck UD, reel RE, tensioner TE2, hang-off clamp HOC, crane CR, and members EM1, EM2 although these reference symbols will not be present in any figure of FIGS. 2-9. Further, the tower pivot axis TPA is shown.

Also shown are a tubulars supply system and an accessory supply system provided on the upper deck UD, which in this case are integrated together and comprise a guiding structure GS and a cart CA guided by the guiding structure. In FIGS. 2-9, the cart CA carries an accessory AC, but the cart CA or a similar other cart may also be able to carry a tubular.

The tubulars supply system is provided to supply tubulars to an essentially horizontal tubular supply position in the vicinity of the tower structure. The accessory supply system is provided to supply an accessory, such as the accessory AC, to an essentially horizontal accessory supply position in the vicinity of the tower structure JT. In this embodiment, the tubular supply position and the accessory supply position are located at the rear-most position of the guiding structure next to the tower JT.

To transport tubulars and accessories between the respective tubulars supply position and accessory supply position and the firing line a loader system is provided, which loader system comprises a loader device LD, supply rails SR and a line-up tool LUT in order to transport a tubular or in this case an accessory between respectively the essentially horizontal tubular supply position or essentially horizontal accessory supply position and the firing line FL.

Figure 2:
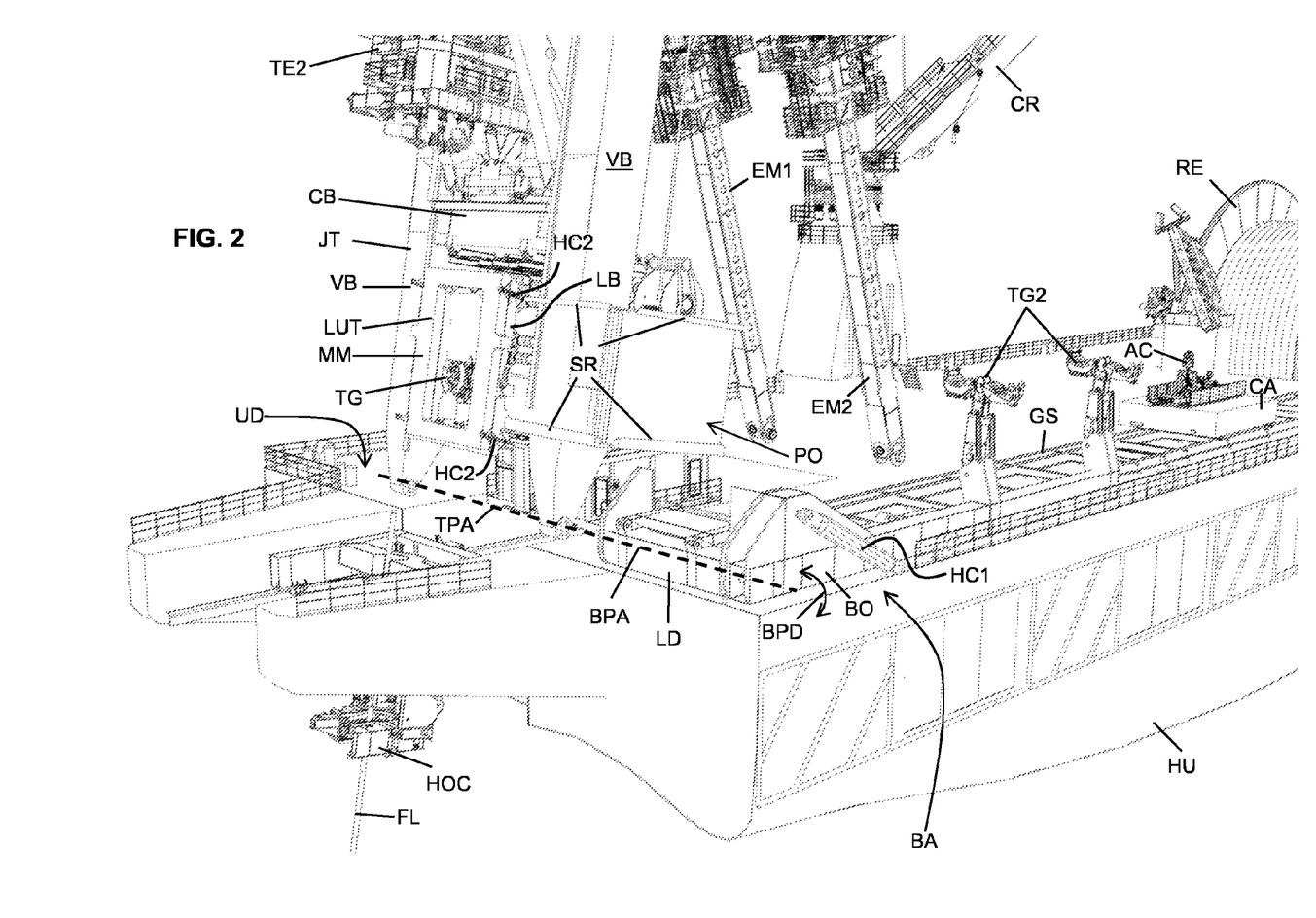
FIG. 2-9 depict different steps of a method for lowering an accessory using the marine pipelay system of FIG. 1.
Figure 3:
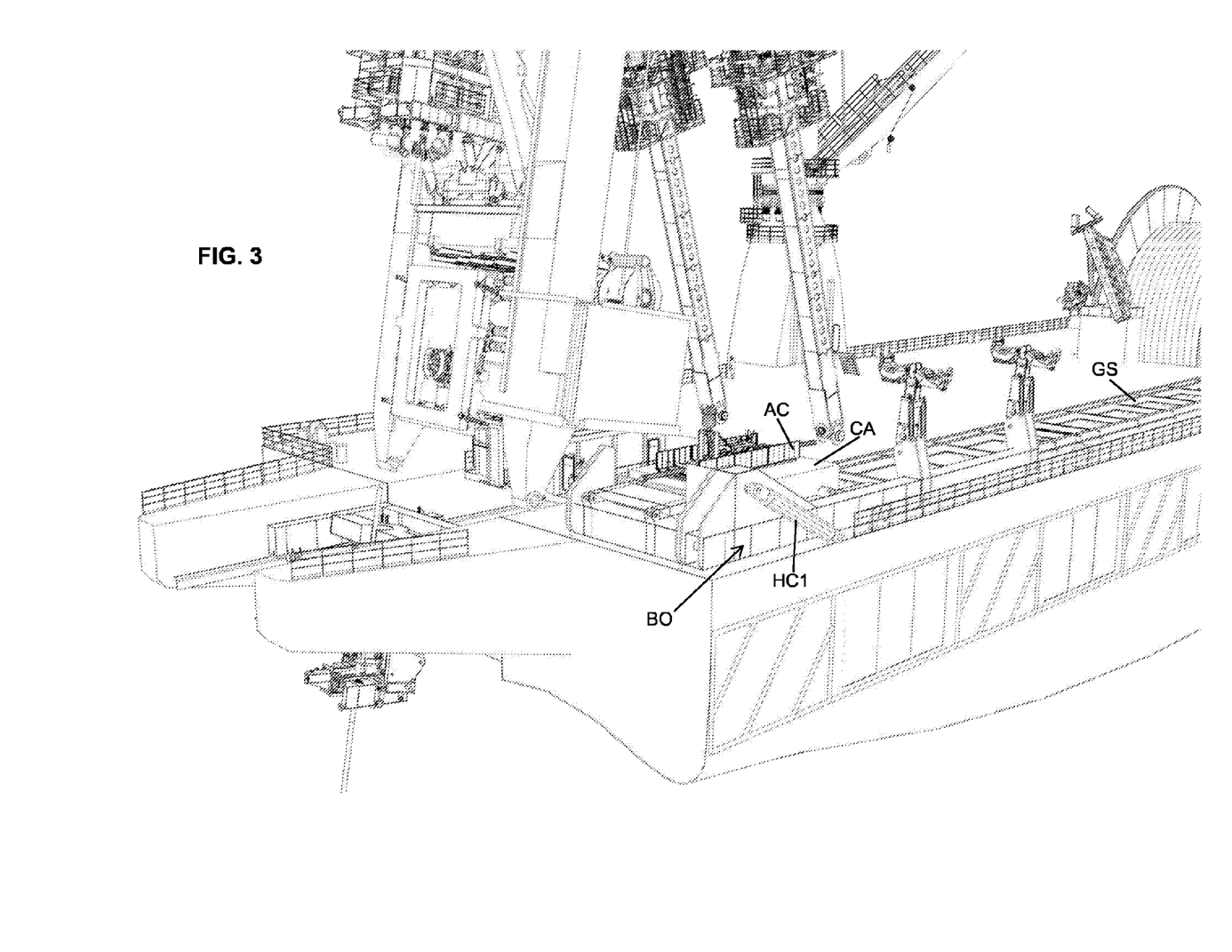

The loader device LD, which is provided on the upper deck UD, comprises a base BA and a boom BO which is pivotable with respect to the base BA in a boom pivot direction BPD about a horizontal boom pivot axis BPA between a lowered position and a raised position. The lowered position, as shown in FIGS. 2, 3 and 9, allows to grip a tubular or accessory provided in respectively the tubular supply position and accessory supply position. The raised position, as shown in FIGS. 4-8 allows to deliver a received tubular or accessory to the firing line or to receive a tubular or accessory coming from the firing line.

In this embodiment, the base BA forms part of the upper deck UD, but a separate base can also be provided. Pivoting of the boom BO is carried out using a hydraulic cylinder HC1.

The boom pivot axis BPA coincides with the tower pivot axis TPA, so that the boom can be positioned relative to the tower independent of the angular orientation of the tower.

The supply rails SR are provided on the J-lay tower structure JT and extend in a substantially horizontal direction between the tower JT and the loader device LD. In this embodiment, a portion PO of the supply rails SR is moveable between a retracted position as shown in FIGS. 2-5 to allow movement of the boom of the loader device without interfering with the supply rails, and an operational position in which the line-up tool is able to travel along said supply rails including portion PO.

The moveability of the portion PO of the supply rails is in this embodiment implemented by allowing the portion to pivot about a pivot axis that extends substantially parallel to a longitudinal axis of the J-lay tower structure JT.

The line-up tool LUT is configured to travel along the supply rails SR, is configured to exchange a tubular with the loader device LD to transport the tubular between the loader device and the firing line FL, and is configured to exchange an accessory with the loader device LD to transport the accessory between the loader device and the firing line FL. During this transport, the line-up tool is not supported by the loader device, but is supported by the supply rails SR which in turn are supported by the tower structure.

The line-up tool comprises a base member LB, a moveable member MM and an actuation system AS in the form of hydraulic cylinders HC2 to position the moveable member MM relative to the base member LB. The base member is configured to engage with the supply rails SR.

Attached to the moveable member MM are two tubular grippers TG adapted to grip a tubular. The tubular grippers TG are moveable relative to the moveable member between a retracted position as shown in the Figs in which the line-up tool is able to handle an accessory, and an operational position in which the tubular gripper is able to grip a tubular.

Figure 4:
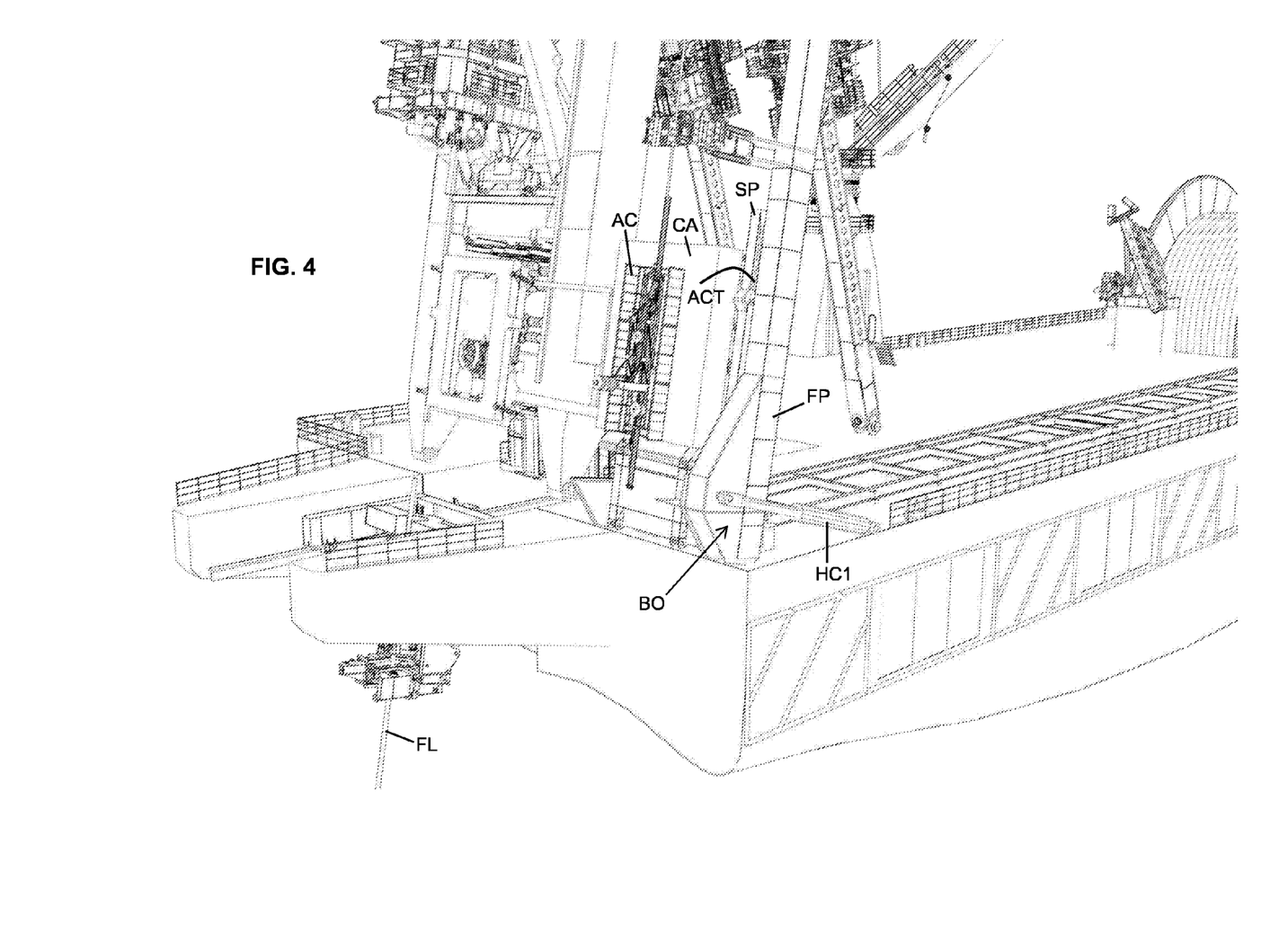
Figure 5:
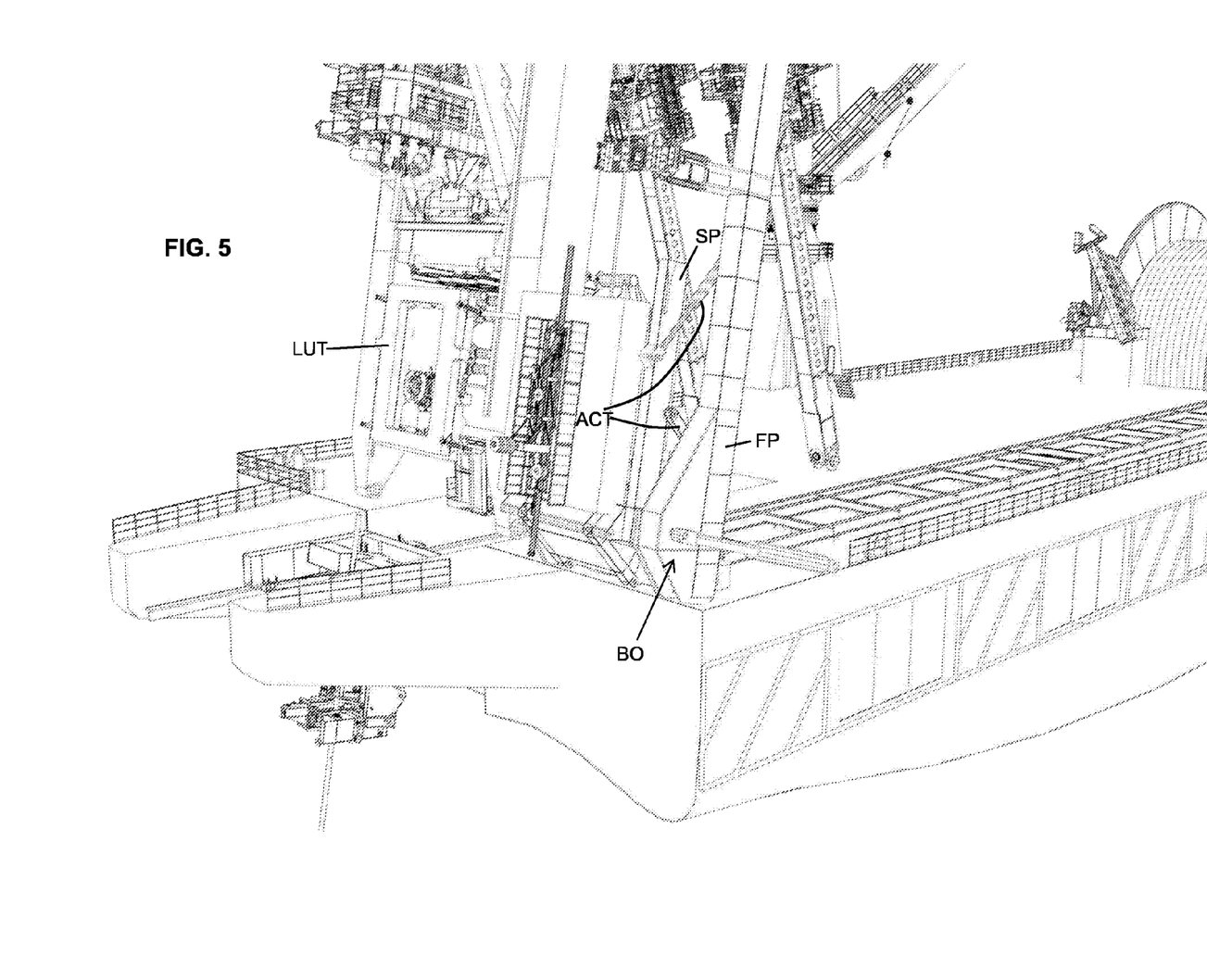

In FIGS. 4 and 5 it is shown that the boom BO comprises a first part FP, a second part SP and actuators ACT to position the second part SP relative to the first part FP. The first part FP of the boom BO comprises tubular grippers TG2 for gripping a tubular. The tubular grippers TG2 on the boom are moveable to exchange a tubular with the tubular grippers on the line-up tool when the tubular grippers on the line-up tool are in the operational position.

FIG. 2 depicts the start of a method to lower the accessory AC. As an accessory is handled by the loader system, the tubular grippers TG on the line-up tool are in the retracted position and the tubular grippers on the boom are also positioned such that they do not interfere with the accessory.

The accessory AC is placed on the cart CA which acts as supporting element for the accessory. Positioning the accessory on the cart CA is in this embodiment carried out remote from the boom BO. The accessory AC may for instance be placed on the cart CA already present on the guiding structure GS by the crane CR or the combination of accessory and cart is placed on the guiding structure. The cart CA is guidable along the guide structure GS. The cart CA comprises attachment members (not shown) to engage with attachment members on the second part SP of the boom BO of the loader device LD.

The boom BO is therefore placed in the lower position by the hydraulic cylinder as shown in FIG. 2. In FIG. 3, the accessory supply system has supplied the cart CA including accessory AC to the accessory supply position. The attachment members on the cart CA engage with the attachment members on the second part of the boom, so that the boom is able to move the cart CA including accessory AC to a raised position as shown in FIG. 4. The raised position in FIG. 4 is characterized in that the angular orientation of the accessory is similar as the angular orientation of the firing line FL.

In FIG. 5, the actuators ACT between the first part FP and the second part SP of the boom BO have been operated to position the second part SP relative to the first part FP such that the line-up tool is able to be positioned behind the cart CA. Hence, in this embodiment, the second part SP is moved away from the first part FP by the actuators ACT.

Figure 6:
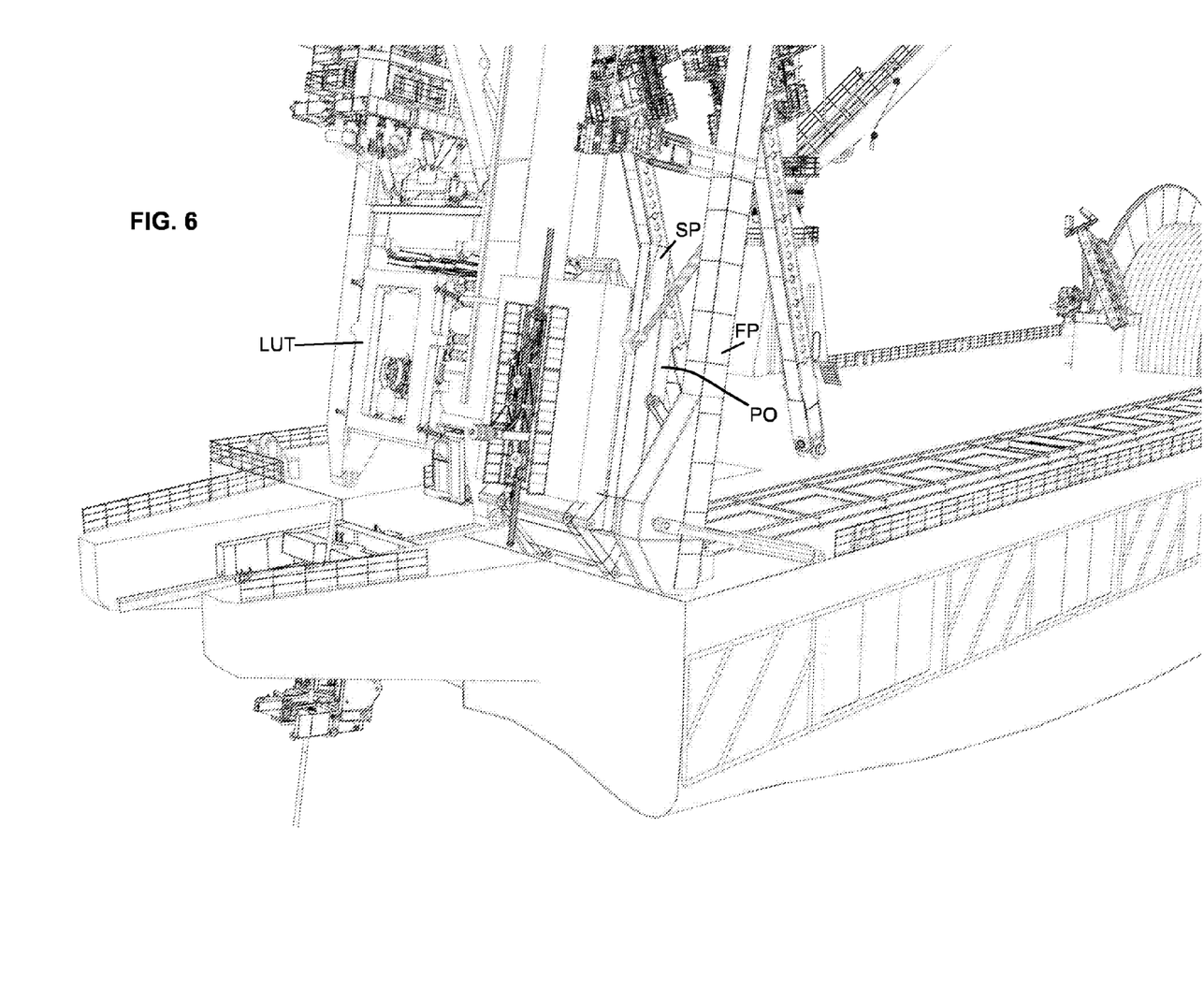
Figure 7:
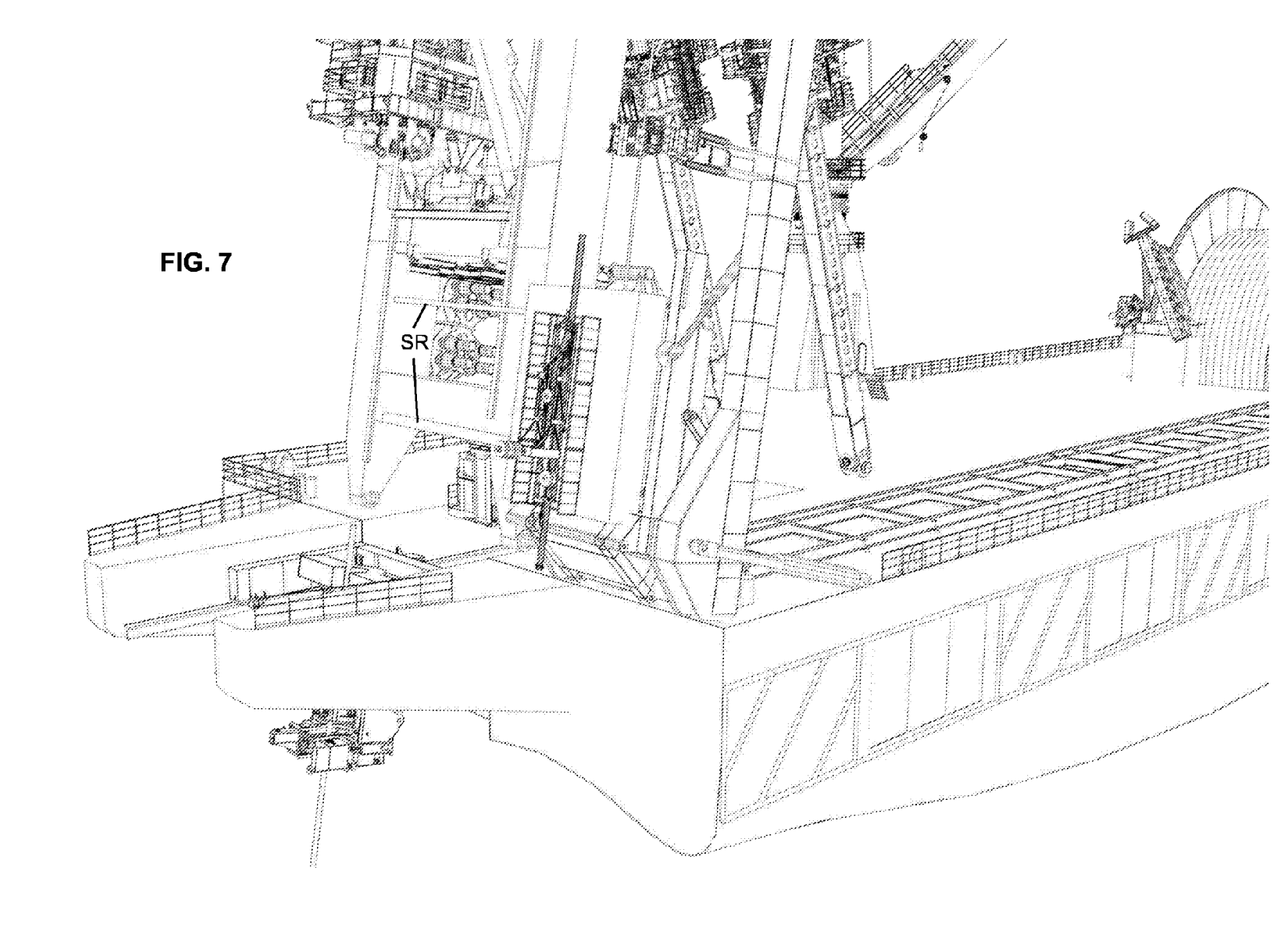

In FIG. 6, the portion PO of the supply rails SR is moved to the operational position allowing the line-up tool LUT to be positioned behind the cart CA as shown in FIG. 7.

The line-up tool comprises tool attachment members that can engage with attachment members on the cart CA in order to hand over the cart CA from the boom BO to the line-up tool. Hence, the line-up tool is attached to the cart CA first by engaging the appropriate attachment members and subsequently the cart CA is released by the boom BO by disengaging the respective attachment members. The actuators ACT may be used to engage the attachment members on the cart CA with corresponding attachment members on the line-up tool.

Figure 8:
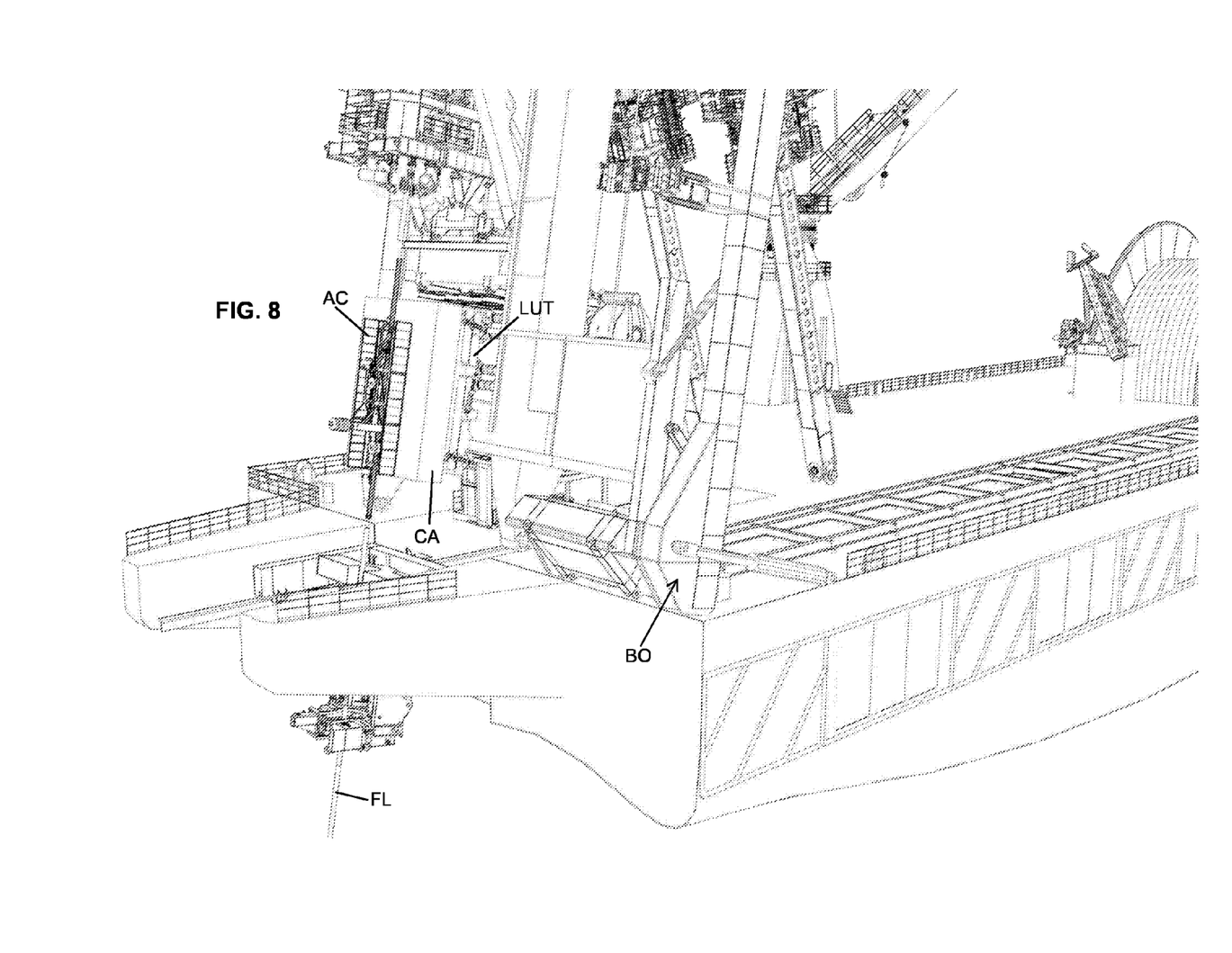
Figure 9:
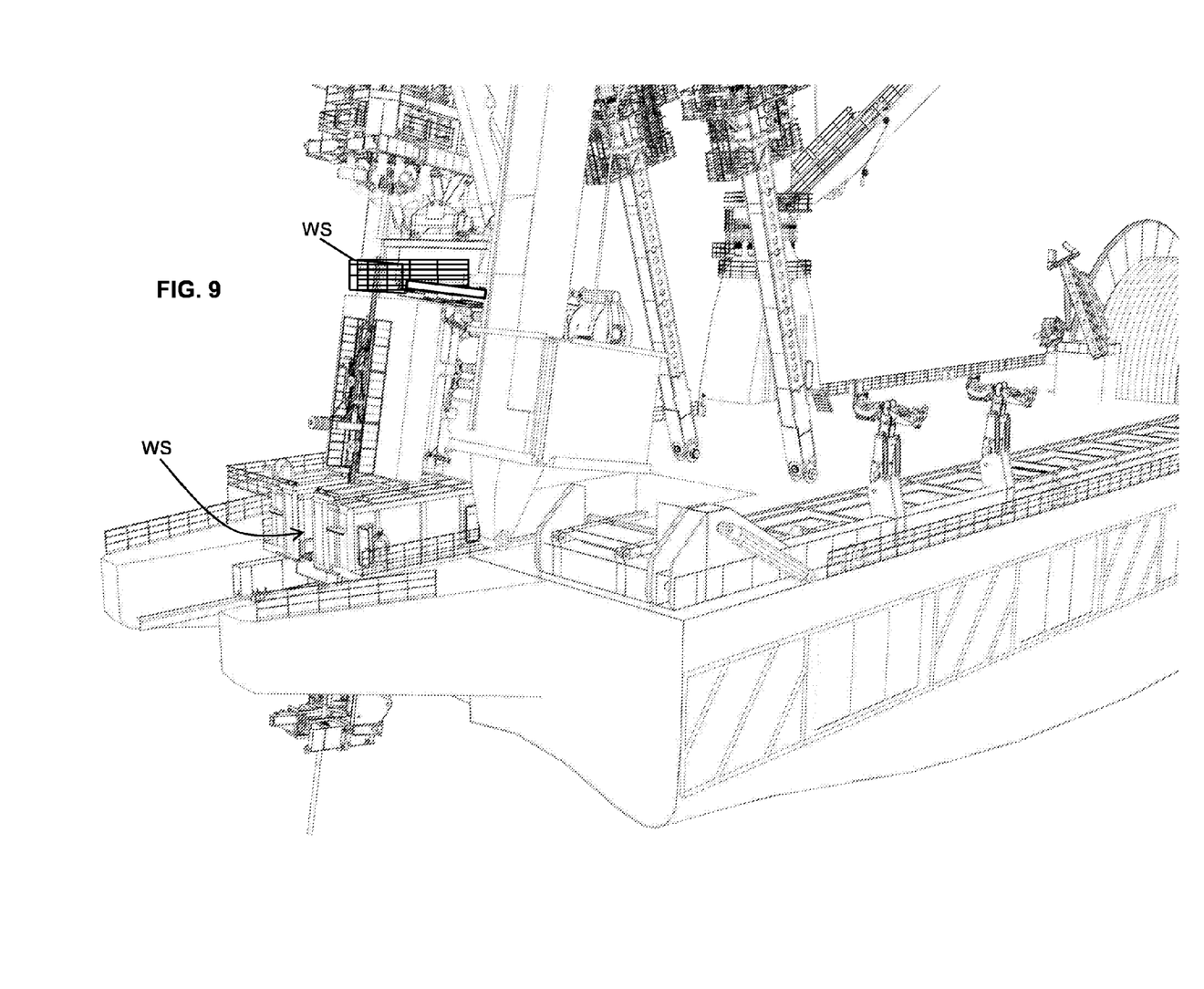

After releasing the cart CA from the boom BO, the line-up tool is able to move the accessory to the firing line as shown in FIG. 8, where the accessory can be connected to adjacent pipeline portions as shown in FIG. 9. In FIG. 9, welding stations WS are provided around the accessory and pipeline portions to connect them together. To position the accessory properly relative to the pipeline portions, use can be made of the hydraulic cylinders HC2 between the base member and the moveable member of the line-up tool.

It will be apparent that the reverse or opposite of the above described method can be used to raise a tubular or accessory.

When lowering or raising tubulars, the cart on which the tubulars are presented to the loader device will usually not be pivoted to the raised position by the loader device and handled by the line-up tool. Instead, the tubulars are gripped by the grippers on the boom and handed over to the gripper on the line-up tool.

The invention claimed is:

1. A tubular installation system for J-laying tubulars, wherein the system comprises:
   a J-lay tower structure for lowering and raising a tubular or an accessory along a firing line extending along the tower structure;
   a tubulars supply system for supplying tubulars to an essentially horizontal tubular supply position;
   an accessory supply system for supplying an accessory to an essentially horizontal accessory supply position; and a loader system configured for transporting a tubular between the tubular supply position and the firing line, and configured for transporting an accessory between the accessory supply position and the firing line, wherein the loader system comprises a loader device and a line-up tool, wherein the loader device comprises a base and a boom which is pivotable with respect to the base between a lowered position for gripping a tubular in the tubular supply position and for gripping an accessory in the accessory supply position, and a raised position for exchanging a tubular or accessory with the line-up tool, wherein the line-up tool is configured to exchange a tubular with the loader device and to transport a tubular between the loader device and the firing line, wherein the line-up tool is further configured to exchange an accessory with the loader device and to transport an accessory between the loader device and the firing line, wherein the loader system further comprises supply rails provided on the J-lay tower structure, and wherein at least a portion of the supply rails are moveable between a retracted position in which an accessory can be moved between the lowered and raised position of the boom of the loader device without interfering with the supply rails, and an operational position in which the line-up tool is able to travel along said portion of the supply rails to exchange a tubular or accessory with the loader device.

2. The tubular installation system according to claim 1, further comprising a support for supporting the J-lay tower.

3. The tubular installation system according to claim 2, wherein the accessory supply system comprises rails on the support to supply an accessory.

4. The tubular installation system according to claim 2, wherein one or more of the following are also provided on the support: the tubulars supply system, the accessory supply system and the loader device of the loader system.

5. The tubular installation system according to claim 1, wherein the supply rails extend in an essentially horizontal direction between the J-lay tower structure and the loader device at least during transport of a tubular or accessory between the loader device and the firing line when the loader device is in the raised position, and wherein the line-up tool is configured to travel along the supply rails.

6. The tubular installation device according to claim 1, wherein the boom of the loader device of the loader system is pivotable with respect to the base in a boom pivot direction about a horizontal boom pivot axis.

7. The tubular installation system according to claim 6, wherein the J-lay tower structure is pivotable about a substantially horizontal tower pivot axis, and wherein the boom pivot axis and the tower pivot axis coincide.

8. The tubular installation system according to claim 1, wherein the line-up tool comprises a base member, a moveable member and an actuation system for positioning the moveable member relative to the base member, and wherein the line-up tool comprises a tubular gripper adapted for gripping a tubular.

9. The tubular installation system according to claim 8, wherein the accessory supply system is configured to supply an accessory on a supporting element to the essentially horizontal accessory supply position, wherein the supporting element comprises attachment members, wherein the boom of the loader device comprises boom attachment members to engage with at least one attachment member of the supporting element for temporarily attaching the supporting element to the boom, and wherein the line-up tool comprises tool attachment members to engage with at least one attachment member of the supporting element to temporarily attach the supporting element to the line-up tool, and wherein the tool attachment members are provided on the moveable member of the line-up tool.

10. The tubular installation system according to claim 8, wherein the accessory supply system is configured to supply an accessory on a supporting element to the essentially horizontal accessory supply position, wherein the supporting element comprises attachment members, wherein the boom of the loader device comprises boom attachment members to engage with at least one attachment member of the supporting element for temporarily attaching the supporting element to the boom, and wherein the line-up tool comprises tool attachment members to engage with at least one attachment member of the supporting element to temporarily attach the supporting element to the line-up tool, and wherein the tubular gripper is moveable relative to the moveable member between a retracted position in which the tool attachment members are able to engage with at least one attachment member of the supporting element, and an operational position in which the tubular gripper is able to grip a tubular.

11. The tubular installation system according to claim 1, wherein the accessory supply system is configured to supply an accessory on a supporting element to the essentially horizontal accessory supply position, wherein the supporting element comprises attachment members, wherein the boom of the loader device comprises boom attachment members to engage with at least one attachment member of the supporting element for temporarily attaching the supporting element to the boom, and wherein the line-up tool comprises tool attachment members to engage with at least one attachment member of the supporting element to temporarily attach the supporting element to the line-up tool.

12. The tubular installation system according to claim 11, wherein the boom of the loader device comprises a first part, a second part and actuators to position the second part relative to the first part, and wherein the boom attachment members are provided on the second part of the boom.

13. The tubular installation system according to claim 12, wherein a tubular gripper adapted for gripping a tubular is provided on the boom of the loader device, wherein the tubular gripper is provided on the first part of the boom of the loader device.

14. The tubular installation system according to claim 11, wherein the accessory supply system comprises rails on the support to supply an accessory, and wherein the supporting element is configured to travel along the rails of the accessory supply system between the essentially horizontal accessory supply position and a storage position.

15. The tubular installation system according to claim 1, wherein said portion of the supply rails are pivotable about a pivot axis that extends parallel to a longitudinal axis of the J-lay tower structure.

16. The tubular installation system according to claim 1, wherein a tubular gripper adapted for gripping a tubular is provided on the boom of the loader device.

17. A marine pipelay system comprising:
a vessel; and
the tubular installation system according to claim 1.

18. A marine pipelay system, comprising:
a vessel; and
the tubular installation system according to claim 2, wherein the support of the tubular installation system is an integral part of the vessel.

19. A method for handling a tubular or accessory using a tubular installation system according to claim 1, comprising the following steps:
   a. providing the boom of the loader device in the lowered position;
   b. supplying a tubular or accessory to respectively the essentially horizontal tubular supply position or the essentially horizontal accessory supply position;
   c. gripping the tubular or accessory;
   d. moving the boom to the raised position;
   e. exchanging the tubular or accessory with the line-up tool;
   f. transporting the tubular or accessory to the firing line.

20. A tubular installation system for J-laying tubulars, wherein the system comprises:
   a J-lay tower structure for lowering and raising a tubular or an accessory along a firing line extending along the tower structure;
   a tubulars supply system for supplying tubulars to an essentially horizontal tubular supply position;
   an accessory supply system for supplying an accessory to an essentially horizontal accessory supply position; and
   a loader system configured for transporting a tubular between the tubular supply position and the firing line, and configured for transporting an accessory between the accessory supply position and the firing line, wherein the loader system comprises a loader device and a line-up tool,
   wherein the loader device comprises a base and a boom which is pivotable with respect to the base between a lowered position for gripping a tubular in the tubular supply position and for gripping an accessory in the accessory supply position, and a raised position for exchanging a tubular or accessory with the line-up tool,
   wherein the line-up tool is configured to exchange a tubular with the loader device and to transport a tubular between the loader device and the firing line,
   wherein the line-up tool is further configured to exchange an accessory with the loader device and to transport an accessory between the loader device and the firing line, and
   wherein the boom comprises a first part and a second part and actuators configured to move the first part relative to the second part to position the line-up tool behind the accessory or tubular when in the boom is in the raised position.

* * * * *